Jan. 11, 1949.  W. L. DAVIDSON ET AL  2,458,570
MOUNTING FOR FLUID CONTAINERS
Filed Feb. 9, 1945
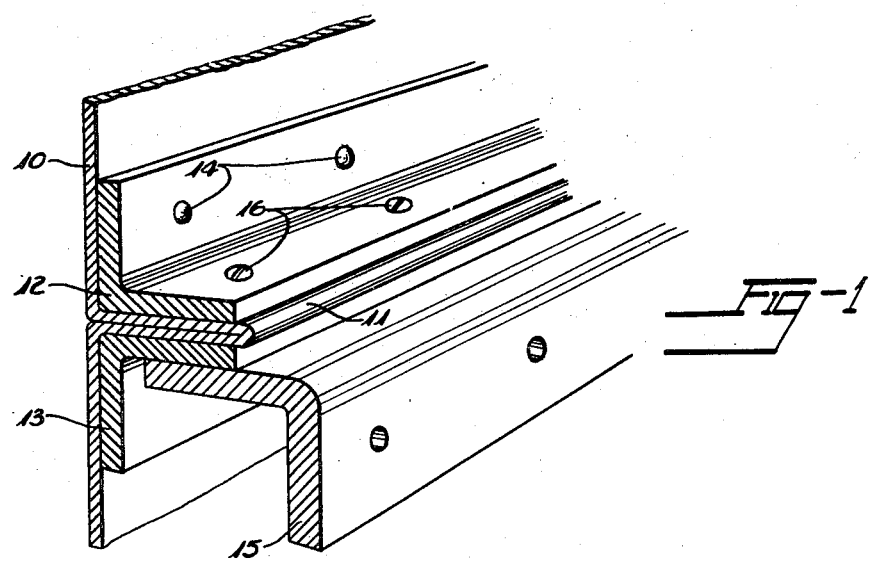
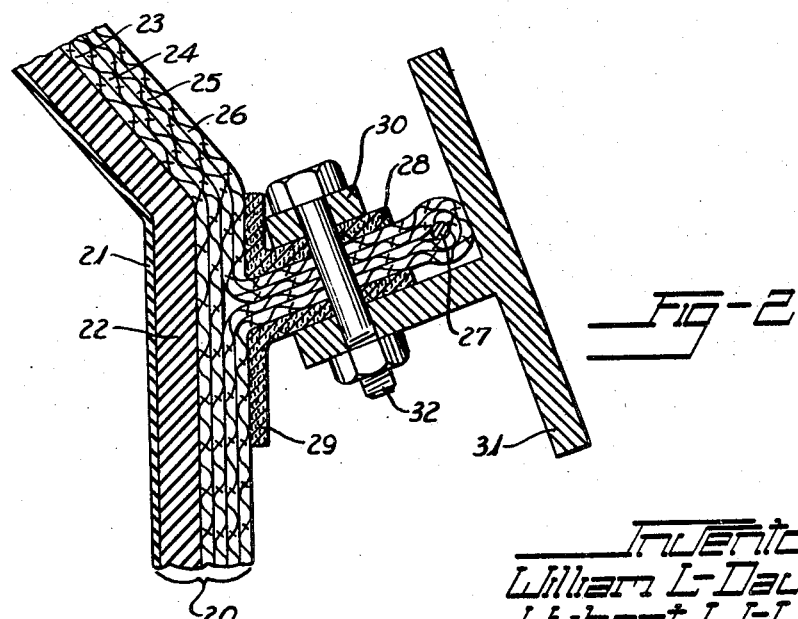
Inventors
William L. Davidson
Hubert W. Lewis
By Harold S. Meyer
Atty.

Patented Jan. 11, 1949

2,458,570

UNITED STATES PATENT OFFICE 2,458,570

MOUNTING FOR FLUID CONTAINERS

William L. Davidson and Hubert W. Lewis, Akron, Ohio, assignors to The B. F. Goodrich Company, New York, N. Y., a corporation of New York Application February 9, 1945, Serial No. 576,974

3 Claims. (Cl. 248—200)

This invention relates to a mounting for fluid containers of vehicles and pertains more specifically to such a mounting for non-metallic self-sealing or crash proof fuel tanks, particularly non-metallic tanks used in airplanes or other military vehicles exposed to gunfire.

The principal object of the invention is to provide a mounting which is strong, and at the same time, extremely light in weight.

A second object is to provide a mounting in which the loading stresses are distributed equally around the periphery of the tank, thus minimizing the impairment of support by each penetration of the mounting by a projectile.

A third object is to provide a mounting which is integrally bound into the structure of the tank itself.

Other objects of the invention will become apparent from the following description.

These objects are attained by providing an outwardly extending fold in the wall of the tank and means for securing the fold to the framework of the vehicle. When the tank wall is of laminated construction, only the outer layer or layers need be folded outwardly, the inner layers retaining their normal configuration.

The mounting device of our invention is shown in the appended drawing in which:

Fig. 1 is a view in perspective cut away in section of a tank embodying our mounting; and Fig. 2 is a detailed cross-sectional view of a laminated non-metallic self-sealing tank embodying our device.

In Fig. 1 tank wall 10, which may be of any desired construction, as for example, metal, laminated fabric and rubber, fabric impregnated with thermosetting resinous materials, such as phenol aldehyde, or urea-formaldehyde resins, or the like, is shown provided with an outwardly extending fold 11. This fold is clamped between and reinforced by the two angle members 12 and 13, which may be made of any suitable material having the necessary properties of strength and rigidity, such as metal, wood, vulcanized fiber, hard rubber, phenolaldehyde resin, or the like. These angle members may be secured to the tank wall by means of rivets or bolts 14 or by means of any suitable adhesive cements, many of which are well known to the art. Supporting member or stringer 15, which is drilled and tapped to receive screws 16 is then placed adjacent to the assembly and clamped thereto by means of screws 16.

In Fig. 2 the device of our invention is shown adapted to a non-metallic, bullet-sealing fuel tank of the type widely used in aircraft and other military vehicles exposed to gunfire. In this case the wall 20 of the fuel tank consists of a gasoline-resistant lining 21, which may be made of gasoline-resistant synthetic rubber such as a copolymer of butadiene with acrylonitrile, or the like; a sealing layer 22 of a rubber-like material which swells, but does not dissolve in gasoline, such as slightly vulcanized soft rubber; and a rigid outer shell consisting of a plurality of layers 23, 24, 25 and 26 of fabric impregnated with a resinous material such as a urea-formaldehyde or phenol-formaldehyde resin, hard rubber, or the like, which is cured to a hard, rigid, solid material. The outer layers 25 and 26 are folded outwardly during the construction of the tank, around mandrel 27 and cured in that position. Vulcanized fiber angles 28 and 29 are then fitted on each side of the fold and adhered with a suitable cement to serve as reinforcement. A rigid bar 30 which may be made of any suitable material such as metal, wood, vulcanized fiber, hard rubber, synthetic resin, or the like, is then placed adjacent one side of the fold and the whole assembly is clamped to stringer 31, which is a part of the framework of the vehicle, by means of bolt 32.

It is apparent that with our mounting, which extends substantially completely around the periphery of the tank, the load is widely distributed so that the number of direct hits upon the mounting required to impair its effectiveness is greatly increased without undue increase in weight, as compared to a tank mounted by means of the conventional metal strap or band passing around and under the tank, which may be clipped in two by a single hit.

Moreover, the use of our mounting with non-metallic fuel tanks of the bullet-sealing or crash-proof type provides a substantial reduction of the fire hazard, as compared with the methods heretofore used for mounting such tanks. The metal straps or bands, which have heretofore been used, together with the metal frame of the vehicle adjacent to the tank walls, present a relatively large area of metal in close proximity to the tank and contents; when the metal is struck by a projectile, sparks ensue, causing a fire hazard. With our new mounting, however, the metal may be completely eliminated; if any metal is used it is closely adjacent to the frame of the vehicle so that there is little or no increase in the area of metal next to the tank which is exposed to gunfire.

Although specific embodiments of our invention have been herein described, we do not intend to limit ourselves solely thereto, but to include all of the obvious variations and modifications falling within the spirit and scope of the appended claims.

We claim:

1. A fluid container for a vehicle, said container comprising a hollow body having a wall comprising a plurality of layers of fabric, at least one of the outer layers of fabric having a portion folded upon itself to form an outwardly extending fold adapted to support substantially the entire weight of said body and contents, and means for supporting said body from a frame of said vehicle, said means comprising a clamping means for clamping said fold to said frame.

2. A self-sealing fuel tank for a vehicle, said tank comprising a hollow body having a wall comprising a plurality of layers of fabric, at least one of the outer layers of fabric having a portion folded upon itself to form an outwardly extending fold forming an angle with said wall and adapted to support substantially the entire weight of said body and contents, means for supporting said body from a frame of said vehicle, said means comprising a clamping means for clamping said fold to said support, and a pair of reinforcing angle members extending along the outer surface of said body on each side of said fold between said fold and said clamping means and against said body in the angle between said fold and said wall and terminating beyond said angle.

3. A fluid container for a vehicle, said container comprising a hollow body having a wall comprising a plurality of layers of fabric, at least one of the outer layers of fabric having an outwardly extending fold, and means for securing said fold to a frame of said vehicle to support said hollow body from said frame.

WILLIAM L. DAVIDSON.
HUBERT W. LEWIS.

REFERENCES CITED

The following references are of record in the file of this patent:

UNITED STATES PATENTS

| Number | Name | Date |
|---|---|---|
| 841,462 | Smith | Jan. 15, 1907 |
| 1,298,080 | Mougey et al. | Mar. 25, 1919 |
| 2,373,221 | Blaylock et al. | Apr. 10, 1945 |
| 2,374,332 | Crawford | Apr. 24, 1945 |